US012668230B2

(12) United States Patent
Yamada

(10) Patent No.: US 12,668,230 B2
(45) Date of Patent: Jun. 30, 2026

(54) HYBRID VEHICLE

(71) Applicant: TOYOTA JIDOSHA KABUSHIKI KAISHA, Toyota (JP)

(72) Inventor: Yuki Yamada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/918,608

(22) Filed: Oct. 17, 2024

(65) Prior Publication Data

US 2025/0128692 A1 Apr. 24, 2025

(30) Foreign Application Priority Data

Oct. 20, 2023 (JP) ................................ 2023-180800

(51) Int. Cl.
| | |
|---|---|
| *B60W 20/12* | (2016.01) |
| *B60W 10/06* | (2006.01) |
| *B60W 10/08* | (2006.01) |
| *B60W 10/26* | (2006.01) |

(52) U.S. Cl.
CPC ............ *B60W 20/12* (2016.01); *B60W 10/06* (2013.01); *B60W 10/08* (2013.01); *B60W 10/26* (2013.01); *B60W 2554/406* (2020.02); *B60W 2710/244* (2013.01)

(58) Field of Classification Search
CPC ...... B60W 20/12; B60W 10/06; B60W 10/08; B60W 10/26; B60W 20/13; B60W 2554/406; B60W 2556/50; B60W 2710/244; B60W 2552/15; B60W 20/14; B60W 20/16; B60W 20/40; B60W 30/18018; B60W 40/04; B60W 40/076; B60W 50/0097; B60W 20/20; B60W 2420/403; B60W 2420/408; B60W 2520/10; B60W 2520/105; B60W 2540/10; B60W 2710/06; B60W 2710/08; B60W 20/10; B60W 40/02; Y02T 10/62; Y02T 10/64; B60Y 2200/92
See application file for complete search history.

(56) References Cited

U.S. PATENT DOCUMENTS

| | | | |
|---|---|---|---|
| 2003/0078707 A1 | 4/2003 | Shioda et al. | |
| 2012/0004839 A1* | 1/2012 | Mizuno ................ | B60W 20/12 |
| | | | 701/123 |
| 2016/0325637 A1* | 11/2016 | Payne ..................... | B60L 50/16 |
| 2017/0021730 A1* | 1/2017 | Ogawa ...................... | B60L 7/18 |
| 2017/0021823 A1* | 1/2017 | Ogawa ...................... | B60L 7/18 |
| 2019/0126907 A1* | 5/2019 | Park ....................... | B60W 20/16 |
| 2022/0161780 A1* | 5/2022 | Yokoyama .............. | B60L 58/12 |

(Continued)

FOREIGN PATENT DOCUMENTS

| | | |
|---|---|---|
| JP | 3169100 B2 | 5/2001 |
| JP | 2003-111208 A | 4/2003 |
| JP | 2018-024371 A | 2/2018 |

*Primary Examiner* — Frederick M Brushaber
(74) *Attorney, Agent, or Firm* — Sughrue Mion, PLLC

(57) ABSTRACT

A controller of a hybrid vehicle gives priority to motor driving area driving control to increase a power storage ratio of a storage device from a point that is a first predetermined distance ahead of starting point of motor driving area so as to enable motor driving in the motor driving area over power storage ratio adjustment control, when there is the motor driving area set as an area to be motor driven in a planned or estimated driving route.

4 Claims, 3 Drawing Sheets

(56) References Cited

U.S. PATENT DOCUMENTS

| 2022/0196420 A1* | 6/2022 | Yokoyama | ............ | B60W 20/16 |
| 2022/0205796 A1* | 6/2022 | Wray | ................. | G01C 21/3469 |
| 2022/0234567 A1* | 7/2022 | Yokoyama | ......... | G01C 21/3415 |
| 2023/0264678 A1* | 8/2023 | Ogawa | ................. | B60W 10/06 |
| | | | | 701/22 |

* cited by examiner

HYBRID VEHICLE

CROSS-REFERENCE TO RELATED APPLICATIONS

The present disclosure claims priority to Japanese Patent Application No. 2023-180800 filed Oct. 20, 2023, which is incorporated herein by reference in its entirety including specification, drawings and claims.

TECHNICAL FIELD

This disclosure relates to a hybrid vehicle.

BACKGROUND

Conventional hybrid vehicles of this type have been proposed that switch between an electric vehicle mode in which the electric motor runs alone, an engine mode in which the engine runs alone, and a combined mode in which both run together according to the mode-switching vehicle speed (see, for example, Patent Document 1). This hybrid vehicle can be driven in an environmentally compatible manner by switching the mode-switching vehicle speed for each environment, such as urban, suburban, highway, tunnel, and so on.

CITATION LIST

Patent Document

[Patent Document 1] Japanese Patent Application Laid Open No. H06-187595

SUMMARY

In the hybrid vehicle, when there is a traffic jam on the planned or estimated driving route, the traffic jam driving control may be executed to maintain a high ratio of the power storage device from before the starting point of the traffic jam to the end of the traffic jam. Also, the hybrid vehicle may perform the downhill driving control in which the storage ratio of the power storage device is lowered before the start of the downhill in order to store the regenerative power obtained from the downhill driving in the storage device when there is a downhill in the planned or estimated driving route. In addition, when a motor driving area exists in the planned or estimated driving route, the hybrid vehicle may execute the motor driving area driving control that is a control to increase the power storage ratio of the storage device before the motor driving area in order to motor driving in the motor driving area and to motor drive in the motor driving area. Coordination is necessary when such the traffic jam driving control, the downhill driving control, and the motor driving area driving control are performed at the same time.

The main objective of the hybrid vehicle of the present disclosure is to better coordinate the storage ratio adjustment control and the motor driving area driving control, such as the traffic jam driving control and the downhill driving control.

The hybrid vehicle of the present disclosure has adopted the following measures to achieve the main objectives described above.

The hybrid vehicle of the present disclosure includes an engine capable of outputting power for driving, a motor capable of outputting power for driving, a power storage device capable of exchanging electric power with the motor, and a controller that is programmed to control the engine and the motor by switching between a motor driving mode in which the engine is stopped and the vehicle is driven by the power from the motor, and a normal driving mode in which the vehicle is driven by the power from the engine and the power from the motor as necessary, and performs a power storage ratio adjustment control to adjust the electric storage ratio of the power storage device based on the information of a planned or estimated driving route based on map information and the vehicle's position; the hybrid vehicle is characterized by: when there is a motor driving area set as an area to be motor driven in a planned or estimated driving route, the controller is programmed to give priority to motor driving area driving control to increase the power storage ratio of the storage device from a point that is a first predetermined distance ahead of the starting point of the motor driving area so as to enable motor driving in the motor driving area over the power storage ratio adjustment control.

In the hybrid vehicle of the present disclosure, the controller controls the engine and the motor by switching between the motor driving mode in which the engine is stopped and the vehicle is driven by the power from the motor, and the normal driving mode in which the vehicle is driven by the power from the engine and the power from the motor as necessary, and performs the power storage ratio adjustment control to adjust the electric storage ratio of the power storage device based on the information of the planned or estimated driving route based on map information and the vehicle's position. Then, the controller gives priority to motor driving area driving control to increase the power storage ratio of the storage device from a point that is a first predetermined distance ahead of the starting point of the motor driving area so as to enable motor driving in the motor driving area over the power storage ratio adjustment control, when there is a motor driving area set as an area to be motor driven in a planned or estimated driving route. By giving priority to the motor driving area driving control over the energy storage ratio driving control, motor driving in the motor driving area can be given priority. As a result, more appropriate coordination between the energy storage ratio adjustment control and the motor driving area driving control, such as the traffic jam driving control and the downhill driving control, can be achieved. Here, "planned driving route" means the driving route set by the route guidance from the current location to the destination, and "estimated driving route" means the driving route that is estimated to be driven from the current location.

DESCRIPTION OF EMBODIMENTS

Figure 1:
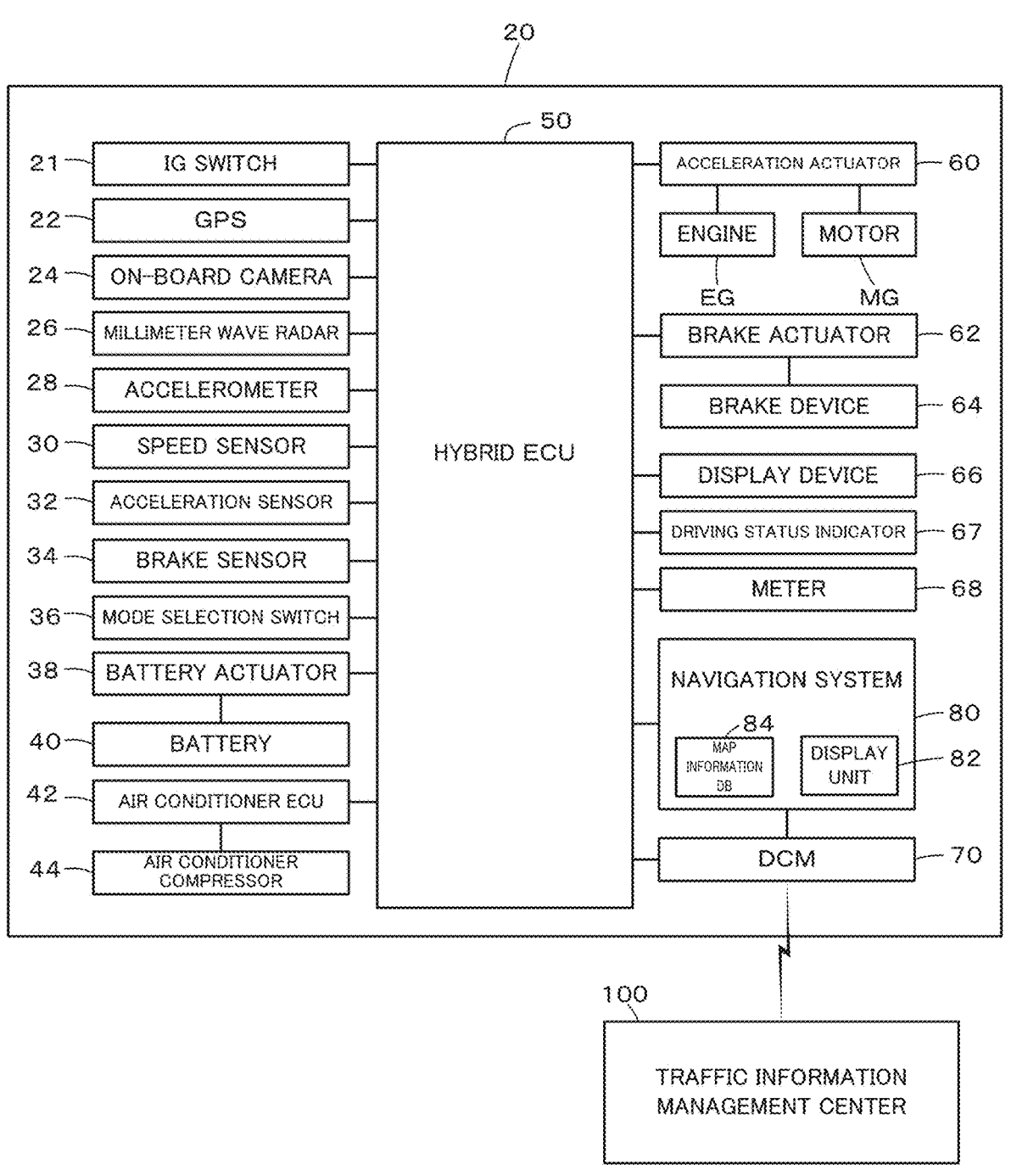
FIG. 1 shows a block diagram of the hybrid vehicle 20 as one embodiment of the present disclosure, with the hybrid ECU 50 shown as a central block.

The following is a description of the embodiment of this disclosure. FIG. 1 shows a block diagram of the hybrid vehicle 20 as one embodiment of the present disclosure, showing the hybrid electronic control unit 50 (hereinafter referred to as hybrid ECU 50) as a block at the center. The hybrid vehicle 20 of the embodiment is equipped with the engine EG and the motor MG as a power source, as shown in the figure. The hybrid vehicle 20 of the embodiment has two driving modes: the motor driving mode in which the vehicle is driven by the power from the motor MG with the engine EG operation stopped, and the normal driving mode in which the vehicle is driven by the power from the engine EG and the power from the motor MG, operating the engine EG as necessary.

The hybrid vehicle 20 of the embodiment is equipped with in addition to a power source, the ignition switch 21, Global Positioning GPS (Global Positioning System, Satellite) 22, the on-board camera 24, the millimeter wave radar 26, the accelerometer 28, the speed sensor 30, the acceleration sensor 32, the brake sensor 34, the mode selection switch 36, the battery actuator 38, the battery 40, the electronic control unit for air conditioners (hereinafter referred to as "air conditioner ECU") 42, the air conditioner compressor 44, the hybrid ECU 50, the acceleration actuator 60, the brake actuator 62, the brake device 64, the display device 66, the driving status indicator 67, the meter 68, the DCM (Data Communication Module) 70, the navigation system 80.

GPS 22 is a device that detects the position of the vehicle based on signals transmitted from multiple GPS satellites. The on-board camera 24 is the camera that captures images of the vehicle's surroundings, such as a front camera that captures images of the front of the vehicle and a rear camera that captures images of the rear of the vehicle. The millimeter wave radar 26 detects the distance and relative speed between the vehicle and the vehicle in front of it or between the vehicle and the vehicle behind it.

The accelerometer 28 is, for example, a sensor that detects acceleration in the front-back direction of the vehicle or in the left-right (lateral) direction of the vehicle. The speed sensor 30 detects the vehicle speed of the vehicle based on wheel speed and other factors. The acceleration sensor 32 detects the acceleration opening degree, etc., according to the amount of the acceleration pedal depressed by the driver. The brake sensor 34 detects the brake position etc. as the amount the driver depresses the brake pedal. The mode selection switch 36 is located near the steering wheel in the driver's seat and is used to switch between the motor driving mode and the normal driving mode.

The battery actuator 38 detects the state of the battery 40, e for example, the voltage between terminals, the charging and discharging currents, and the battery temperature, and manages the battery 40 based on these. The battery actuator 38 calculates the storage ratio SOC as the ratio of the remaining storage capacity to the total storage capacity based on the charge/discharge current. The battery actuator 38 calculates the maximum allowable output power (the output limit Wout) that may be output from the battery 40 and the maximum allowable input power (the input limit Win) that may be input to the battery 40 based on the storage ratio SOC and the battery temperature. The battery 40 is configured as a rechargeable battery that can be charged and discharged, for example, a lithium-ion battery, a nickel-metal hydride battery, or a lead-acid battery.

The air conditioner ECU 42 is configured as a microcomputer centered on a CPU, which is not shown in the figure, and is equipped with ROM, RAM, the flash memory, the input port, the output port, and the communication port, etc. in addition to the CPU. The air conditioner ECU 42 is incorporated in the air conditioning unit that air-conditions the passenger compartment, and drives and controls the air conditioner compressor 44 in the air conditioning unit such that the temperature in the passenger compartment becomes the set temperature.

The engine EG is configured, for example, as an internal combustion engine. The motor MG is configured as the electric motor that also functions as the generator, for example, the synchronous starting electric motor. The motor MG is connected to the battery 40 via an inverter, not shown in the figure, and can output driving power using the power supplied by the battery 40 or charge the battery 40 with the generated power.

The hybrid ECU 50, which is not shown in the figure, is configured as a microcomputer with a CPU at its core, and is equipped with ROM, RAM, the flash memory, the input port, the output port, and the communication port, etc., in addition to the CPU. The hybrid ECU 50 sets the driving mode and also sets the target operating point (the target rotation speed and the target torque) of the engine EG and the torque command of the motor MG based on the set driving mode, the acceleration opening degree from the acceleration sensor 32, the brake position from the brake sensor 34, and the output limit and input limit from the battery actuator 38. The hybrid ECU 50 does not start with accessory on, but with ready on.

The hybrid ECU 50 sets the required driving force and the required power based on the acceleration opening degree from the acceleration sensor 32 and the vehicle speed from the speed sensor 30 when the vehicle is running on the motor. So, the hybrid ECU 50 sets the torque command of the motor MG to output the required driving force and the required power to the vehicle, and transmits the set torque command to the acceleration actuator 60. The hybrid ECU 50 sets the target operating point of the engine EG and the torque command of the motor MG to output the required driving force and the required power to the vehicle when hybrid driving, and transmits the target operating point and the torque command to the acceleration actuator 60. The hybrid ECU 50 also sets the required braking force based on the brake position from the brake sensor 34 and the vehicle speed from the speed sensor 30 when the brake pedal is depressed. The hybrid ECU 50 also sets the torque command for regenerative control of the motor MG based on the required braking force and the vehicle speed, and also sets the target braking force by the brake device. The hybrid ECU 50 then transmits the torque command to the acceleration actuator 60 and the target braking force to the brake actuator 62.

The acceleration actuator 60 drives and controls the engine EG and the motor MG according to the target operating point and the torque command set by the hybrid ECU 50. The acceleration actuator 60 performs the intake air volume control, the fuel injection control, the ignition control, and the intake valve open/close timing control such that the engine EG is operated at the target operating point (the target rotation speed and the target torque). The acceleration actuator 60 also controls the switching of the switching elements of the inverter to drive the motor MG such that the torque corresponding to the torque command is output from the motor MG.

The brake actuator 62 controls the brake device 64 such that the target braking force set by the hybrid ECU 50 is applied to the vehicle by the brake device 64. The brake device 64 is configured as the hydraulically driven friction brake, for example.

The display device 66 is built into the installation panel in front of the driver's seat, for example, and displays various information and also functions as a touch panel. The driving status indicator 67 has an EV indicator and an HV indicator, which are not shown in the figure, and when the vehicle is running in motor driving, the EV indicator is turned on and the HV indicator is turned off, when the vehicle is running in hybrid driving, the EV indicator is turned off and the HV indicator is turned on. The meter 68 is built into the installation panel in front of the driver's seat, for example.

The DCM (Data Communication Module) 70 transmits the vehicle information to the traffic information management center 100 and receives the road traffic information from the traffic information management center 100. The vehicle information can include, for example, the vehicle's position, the vehicle's speed, the driving power, the driving mode, and so on. The road traffic information can include, for example, the information on current and future traffic congestion, the information on the current average vehicle speed and predicted future average vehicle speed in the section on the travel route, the information on traffic regulations, the information on weather, the information on road surface conditions, and the information on maps. The DCM 70 communicates with the traffic information management center 100 at predetermined intervals (e.g., every 30 seconds, 1 minute, 2 minutes, etc.).

The navigation system 80 is the system that guides the vehicle to the set target destination, and is equipped with the display unit 82 and the map information database 84. The display unit 82 is a functional block that has the function of displaying the route to the target destination, the vehicle's position, and other information on the display device 66 based on map information. The navigation system 80 communicates with the traffic information management center 100 via the DCM 70. The navigation system 80 sets the route based on the information of the target destination or the transit destination, the information of the current location (the current position of the own vehicle) obtained by the GPS 22, and the information stored in the map information database 84, when the target destination or the transit destination is set. The navigation system 80 communicates with the traffic information management center 100 at predetermined intervals (e.g., every 3 or 5 minutes) to obtain the road traffic information, and provides the route guidance based on the road traffic information. The map information stored in the map information database 84 includes not only data as the map, but also the road grade, the road type, and the elevation for each driving segment.

The navigation system 80, when providing the route guidance, generates the forward-reading information such as the load information necessary for traveling each travel segment every time it acquires the road traffic information from the traffic information management center 100 (or every predetermined time) based on the information on each travel segment in the travel route in the road traffic information acquired from the traffic information management center 100, the information on the driving load, the vehicle speed of the own vehicle, the driving power of the own vehicle, the driving mode of the own vehicle, etc., and transmits the information to the hybrid ECU 50. The forward-reading information includes the information about the vehicle, such as the current position, the vehicle speed, the driving power, the driving mode, and so on, the Information about current and future traffic jams, the information about the current average vehicle speed and predicted average vehicle speed in the future along the travel route, the information about the traffic restrictions, the information on weather conditions, the information about the road surface condition, the information about maps. The information on the map includes areas that should be driven by the motor (the motor driving area), which are defined by the municipality and other factors. The navigation system 80 can also set the motor driving area by specifying an area, such as an area near the home, through user operation. The navigation system 80 sends a signal to the hybrid ECU 50 to determine whether or not the vehicle is in the motor driving area when driving.

The following describes the operation of the hybrid vehicle 20 configured in this way, especially when deciding to start execution of the motor driving area driving control, in the case where the planned or estimated travel route includes a traffic jam, a downhill slope, or a motor driving area, the motor driving area driving control is given priority over the traffic jam driving control or the downhill slope driving control. The traffic jam driving control is a control that, when there is a traffic jam on the planned or estimated driving route, maintains the storage ratio SOC of the battery 40 at the higher than normal value from a point that is a predetermined distance (e.g., 1 km or 2 km) before the starting point of the traffic jam to the end point of the traffic jam. The downhill driving control is a control to make the storage ratio SOC of the battery 40 lower than usual from a point that is a predetermined distance (such as 1 km or 2 km) before the starting point of the downhill to the starting point of the downhill when there is a downhill on the planned or estimated driving route, and to charge the battery 40 with regenerative power by regenerative control of the motor MG on a downhill slope. The motor driving area driving control is a control to increase the storage ratio SOC of the battery 40 from a point that is a predetermined distance (such as 1 km or 2 km) ahead from the starting point of the motor driving area when the planned or estimated driving route includes a motor driving area that has been set as an area to be motor driven so as to enable motor driving in the motor driving region.

Figure 2:
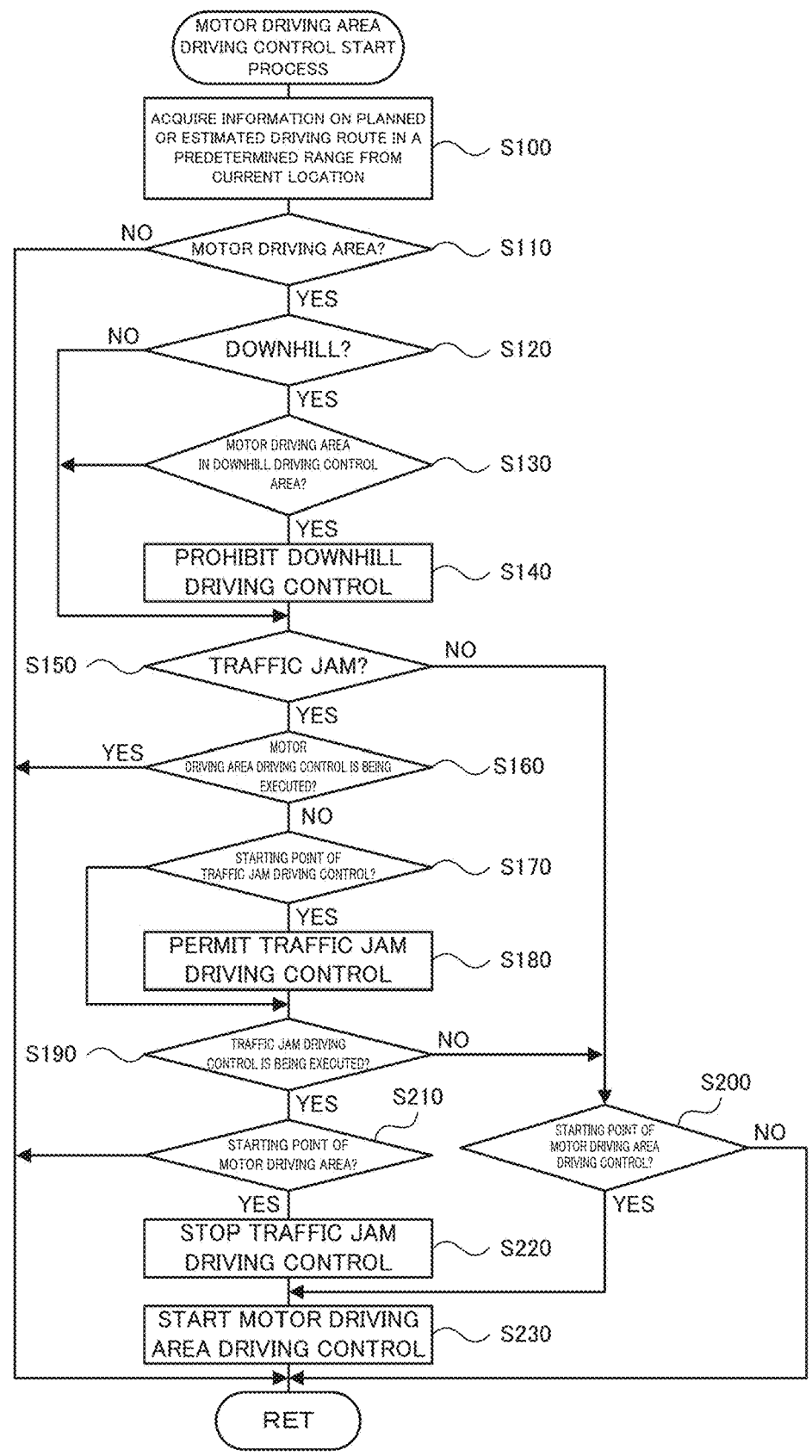
FIG. 2 shows a flowchart of an example of the motor driving area driving control start process executed by the hybrid ECU 50.

FIG. 2 shows a flowchart of an example of the motor driving area driving control start process executed by the hybrid ECU 50. This process is executed repeatedly.

When the motor driving area driving control start process is executed, the hybrid ECU 50 first acquires information on the planned or estimated driving route in a predetermined range from the current location (step S100). The predetermined range can be 5 km, 10 km, 15 km, etc. The planned driving route is the driving route planned by the navigation system 80 as route guidance from the current location to the destination by setting the destination, and the estimated driving route is the driving route that is estimated to be traveled from the current location. The information to be acquired includes, in addition to the forward-reading information described above, whether or not there is a traffic jam, and if a traffic jam exists, the start and end points of the traffic jam, the start and end points of the traffic jam driving control, whether or not there is a downhill slope, and if a downhill slope exists, the start and end points of the downhill slope, the start and end points of downhill driving control, the existence of a motor driving area, and if a motor driving area exists, the start and end points of the motor driving area, and the start and end points of the motor driving area driving control.

Next, it determines whether or not there is the motor driving area in the planned or estimated driving route in the predetermined range (step S110). When it is determined that there is no motor driving area, there is no need to start the motor driving area driving control, and this process is terminated. When it is determined that there is the motor driving area in the planned or estimated motor driving area in the predetermined range, it is determined whether or not there is a downhill in the planned or estimated motor driving area in the predetermined range (step S120). When it is determined that there is a downhill in the planned or estimated driving route in the predetermined range, it determines whether there is the motor driving area in the downhill driving control area from the start point to the end point of the downhill driving control (step S130). When it is determined that the motor driving area is in the downhill driving control area, the downhill driving control is prohibited (step S140).

Figure 3:
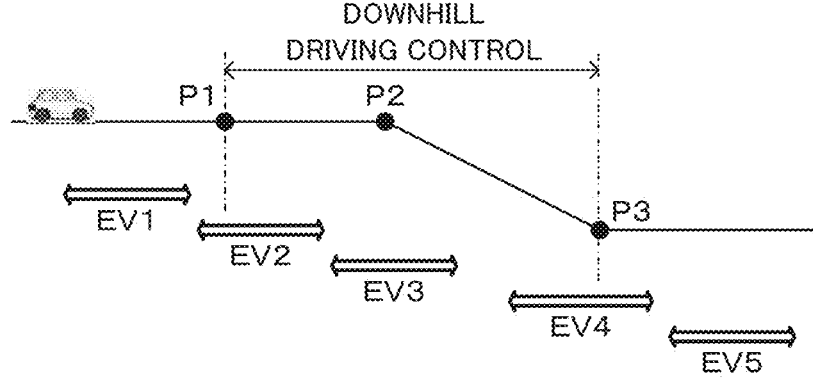
FIG. 3 shows an illustration of the relationship between the downhill driving control and the motor driving area.

FIG. 3 shows an illustration of the relationship between the downhill driving control and the motor driving area. In the figure, the point P1 indicates the start point of downhill driving control, the point P2 indicates the start point of the downhill, and the point P3 indicates the end point of the downhill (the end point of downhill driving control). The section EV1 to the section EV5 with white arrows indicate the section of the motor driving area. In the embodiment, when the motor driving area is the section EV1 or the section EV5, the downhill driving control is not prohibited because the section EV1 or the section EV5 is not in the downhill driving control area. When the motor driving area is in the section EV2, EV3, or EV4, the downhill driving control is prohibited because the section EV2, EV3, or EV4 is in the downhill driving control area. By prohibiting the downhill driving control when the motor driving area is in the downhill driving control area, the downhill driving control can be preferentially executed over the downhill driving control.

When the hybrid ECU 50 determines that there is no downhill in step S120 or prohibits the downhill driving control in step S140, it determines whether there is a traffic jam on the planned or estimated driving route in the predetermined range (step S150). When it is determined that there is no traffic jams on the planned or estimated driving route within the predetermined range, when the starting point of the motor driving area driving control is reached (step S200), the motor driving area driving control is started (step S230) and this process is completed. That is, regardless of whether or not the downhill driving control is prohibited, when it is determined in step S150 that there is no traffic jams, the motor driving area driving control is started when the starting point for the motor driving area driving control is reached.

When the hybrid ECU 50 determines in step S150 that there is a traffic jam on the planned or estimated driving route in the predetermined range, it determines whether or not motor driving area driving control is being executed (step S160). Then, when it is determined that motor driving area driving control is not in progress, the traffic jam driving control is permitted when the starting point of the traffic jam driving control is reached (steps S170, S180). If the traffic jam driving control is permitted, the traffic jam driving control is initiated. The hybrid ECU 50 then determines whether or not the traffic jam driving control is being executed regardless of whether or not the traffic jam driving control is permitted (step S190). As mentioned above, when traffic jam driving control is permitted, the traffic jam driving control starts. Therefore, the case in which it is determined in step S190 that the traffic jam driving control is not being executed corresponds to the case in which the starting point of the traffic jam driving control has not been reached. When it is determined in step S190 that the traffic jam driving control is not being executed, when the starting point for the motor driving area driving control is reached (step S200), the motor driving area driving control is started (step S230) and this process is terminated. That is, when the starting point of the motor driving area driving control is located before the starting point of the traffic jam driving control, the motor driving area driving control is started when the starting point of the motor driving area driving control is reached, and the traffic jam driving control is not executed. On the other hand, when it is determined in step S190 that the traffic jam driving control is being executed, that is, when the starting point of the traffic jam driving control is located before the starting point of the motor driving area driving control and the traffic jam driving control is being executed by passing through the starting point of the traffic jam driving control, when the starting point of the motor driving area is reached, the traffic jam driving control is stopped and the motor driving area driving control is started (steps S210 to S230), and this process is completed. If the traffic jam driving control is started and then the starting point of the motor driving area is reached, the traffic jam driving control is stopped and the motor driving area driving control is started. This allows the motor driving area driving control to be given priority over the traffic jam driving control.

Figure 4:
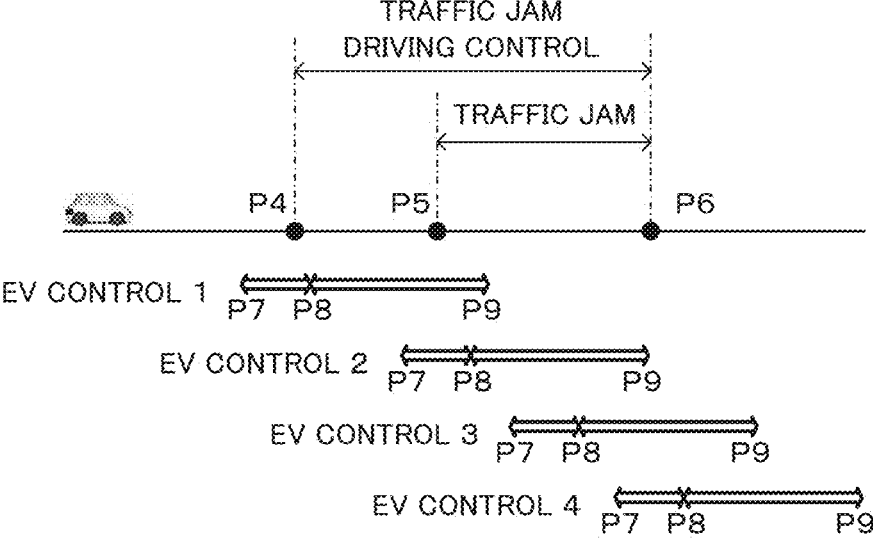
FIG. 4 shows an illustration of the motor driving area and the driving mode when driving in the motor driving area from point P3 to point P4 with point P4 as the destination point near the home.

FIG. 4 shows an illustration of the relationship between the traffic jam driving control and the motor driving area driving control. In the figure, the point P4 indicates the starting point of the traffic jam driving control, the point P5 indicates the starting point of the traffic jam, and the point P6 indicates the ending point of the traffic jam (the end of the traffic jam driving control). The EV control 1 to EV control 4 with two consecutive white arrows indicate the section of the motor driving area driving control, the point P7 in the EV control 1 to EV control 4 indicates the starting point of the motor driving area driving control, the point P8 indicates the start of the motor driving area, and the point P9 indicates the end of the motor driving area (the end of the motor driving area driving control). In the embodiment, when the motor driving area driving control is the EV control 1, the start point P7 of the motor driving area driving control is located before the start point P4 of the traffic jam driving control, so the motor driving area driving control is started when the start point P7 of the motor driving area driving control is reached and the traffic jam driving control is not executed. When the motor driving area driving control is the EV control 2 or the EV control 3, the starting point P4 of the traffic jam driving control is located before the starting point P7 of the motor driving area driving control, so when the starting point P4 of the traffic jam driving control is reached, the traffic jam driving control is started, and when the starting point P8 of the motor driving are is reached, the traffic jam driving control is stopped and the motor driving area driving control is started. When the motor driving area driving control is in the EV control 4, the traffic jam driving control is stopped and the motor driving area driving control is started when the end point P6 of the traffic jam driving control is reached. When the starting point P4 of the traffic jam driving control is located before the starting point P7 of the motor driving area driving control, the traffic jam driving control starts when the starting point P4 of the traffic jam driving control is reached, and the traffic jam driving control is not stopped until the starting point P8 of the motor driving area is reached. This is because there is no problem even if the traffic jam driving control is executed until reaching the starting point P8 of the motor driving area. The reason for this is that the traffic jam driving control is a control to maintain the storage ratio SOC of the battery 40 higher than usual, and that the motor driving area driving control up to the starting point P8 of the motor driving area is a control to increase the storage ratio SOC of the battery 40.

In the hybrid vehicle 20 of the embodiment described above, the motor driving area driving control is given priority over the traffic jam driving control and the downhill driving control. As a result, motor driving in the motor driving area can be prioritized, and the storage ratio adjustment control, such as the traffic jam driving control and the downhill driving control, can be more appropriately coordinated with the motor driving area driving control.

In the hybrid vehicle 20 of the embodiment, the downhill driving control is prohibited when there is a motor driving area in the downhill driving control area from the start point to the end point of the downhill driving control when there is a downhill in the planned or estimated driving route in the predetermined range. This allows the motor driving area driving control to be more reliably prioritized over the downhill driving control. When there is a traffic jam on the planned or estimated driving route within a predetermined range, the start point of the traffic jam driving control is located before the start point of the motor driving area driving control, and when the start point of the traffic jam driving control is reached, the traffic jam driving control is started, then, when the starting point of the motor driving area is reached, the traffic jam driving control is stopped and the motor driving area driving control is started. This allows for harmonization of the motor driving area driving control and the traffic jam driving control while giving higher priority to the motor driving area driving control over the traffic jam driving control.

In the hybrid vehicle 20 of the embodiment, when there is a traffic jam on the planned or estimated driving route within a predetermined range, the start point of the traffic jam driving control is located before the start point of the motor driving area driving control, and when the start point of the traffic jam driving control is reached, the traffic jam driving control is started, then, when the starting point of the motor driving area is reached, the traffic jam driving control shall be stopped and the motor driving area driving control shall be started. However, as with the downhill driving control, it is acceptable to prohibit the traffic jam driving control when there is a traffic jam on the planned or estimated driving route within a predetermined range and there is the motor driving area in the traffic jam driving control area from the start point to the end point of the traffic jam driving control.

In the hybrid vehicle of the present disclosure, the power storage ratio adjustment control may include a traffic jam driving control that maintains a high power storage ratio of the storage device from a point that is a second predetermined distance before the start of the traffic jam to the end of the traffic jam when there is a traffic jam on the planned or estimated driving route. And the controller may start executing the traffic jam driving control when the motor driving area driving control is not being executed at the point where the traffic jam driving control is to be started, continue the motor driving area driving control without executing the traffic jam driving control when the motor driving area driving control is being executed at the point where the traffic jam driving control is to be started, continue the traffic jam driving control until the motor driving area is reached when it reaches the point where the motor driving area driving control is started while executing the traffic jam driving control, and stop the traffic jam driving control and execute the motor driving area driving control when the motor driving area is reached. In this way, the motor driving area driving control can be given priority over the traffic jam driving control, and the motor driving area driving control and the traffic jam driving control can be coordinated more appropriately.

In the hybrid vehicle of the present disclosure, the power storage ratio adjustment control may include a downhill driving control that controls the power storage device so as to lower the storage ratio from a point that is a third predetermined distance before the start of the downhill to the start of the downhill when a downhill is present on the planned or estimated driving route. And the controller may prohibit the downhill driving control when the motor driving area exists between the start point of the downhill driving control and the end point of the downhill. In this way, the motor driving area driving control and the downhill driving control can be more appropriately coordinated with each other with the motor driving area driving control taking priority over the downhill driving control.

The following is a description of the correspondence between the main elements of the embodiment and the main elements of the disclosure described in Summary. In the embodiment, the engine EG corresponds to "the engine," the motor MG corresponds to "the motor," and the hybrid electronic control unit 50 corresponds to "the controller".

The correspondence between the major elements of the embodiment and the major elements of the disclosure described in Summary is an example of how the embodiment can be used to specifically explain the embodiment of the disclosure described in Summary. This does not limit the elements of the disclosure described in Summary. In other words, interpretation of the disclosure described in Summary should be based on the description in that section, and the embodiment is only one specific example of the disclosure described in Summary.

The above is a description of the form for implementing this disclosure using the embodiment. However, the present disclosure is not limited in any way to these embodiments, and can of course be implemented in various forms within the scope that does not depart from the gist of the present disclosure.

INDUSTRIAL APPLICABILITY

This disclosure can be used in the hybrid vehicle manufacturing industry, for example.

The invention claimed is:

1. A hybrid vehicle comprising:
an engine capable of outputting power for driving;
a motor capable of outputting power for driving;
a power storage device capable of exchanging electric power with the motor;
a controller that is programmed to control the engine and the motor by switching between a motor driving mode in which the engine is stopped and the vehicle is driven by the power from the motor, and a normal driving mode in which the vehicle is driven by the power from the engine and the power from the motor as necessary, and performs a power storage ratio adjustment control to adjust the power storage ratio of the power storage device based on the information of a planned or estimated driving route based on map information and the vehicle's position;
wherein, when there is a motor driving area set as an area to be motor driven in a planned or estimated driving route, the controller is programmed to give priority to motor driving area driving control to increase the power storage ratio of the storage device from a point that is a first predetermined distance ahead of the starting point of the motor driving area so as to enable motor driving in the motor driving area over the power storage ratio adjustment control.

2. The hybrid vehicle according to claim 1, wherein:

the power storage ratio adjustment control includes a traffic jam driving control that maintains a high power storage ratio of the storage device from a point that is a second predetermined distance before the start of the traffic jam to the end of the traffic jam when there is a traffic jam on the planned or estimated driving route;

the controller is programmed to start executing the traffic jam driving control when the motor driving area driving control is not being executed at the point where the traffic jam driving control is to be started, continue the motor driving area driving control without executing the traffic jam driving control when the motor driving area driving control is being executed at the point where the traffic jam driving control is to be started, continue the traffic jam driving control until the motor driving area is reached when it reaches the point where the motor driving area driving control is started while executing the traffic jam driving control, and stop the traffic jam driving control and execute the motor driving area driving control when the motor driving area is reached.

3. The hybrid vehicle according to claim 2, wherein:

the power storage ratio adjustment control includes the downhill driving control that controls the power storage device so as to lower the storage ratio from a point that is a third predetermined distance before the start of the downhill to the start of the downhill when a downhill is present on the planned or estimated driving route;

the controller is programmed to prohibit the downhill driving control when the motor driving area exists between the start point of the downhill driving control and the end point of the downhill.

4. The hybrid vehicle according to claim 1, wherein:

the power storage ratio adjustment control includes a downhill driving control that controls the power storage device so as to lower the storage ratio from a point that is a third predetermined distance before the start of the downhill to the start of the downhill when a downhill is present on the planned or estimated driving route;

the controller is programmed to prohibit the downhill driving control when the motor driving area exists between the start point of the downhill driving control and the end point of the downhill.

* * * * *